Aug. 11, 1959     M. BOCHORY     2,899,033
AUTOMATIC CLUTCH CONSTRUCTION
Filed Sept. 28, 1954     3 Sheets—Sheet 1
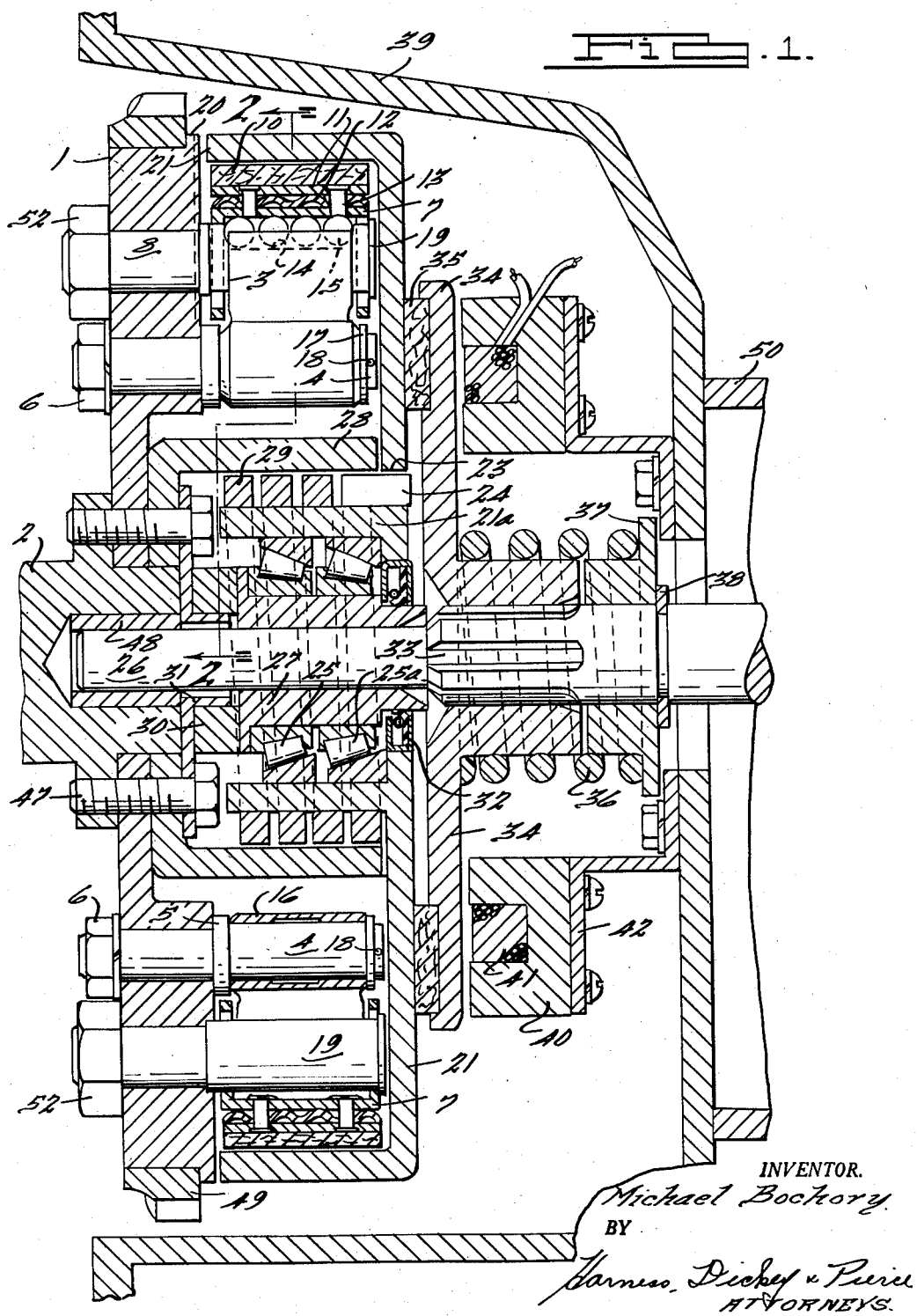
INVENTOR.
Michael Bochory
BY
Harness, Dickey & Pierce
ATTORNEYS.

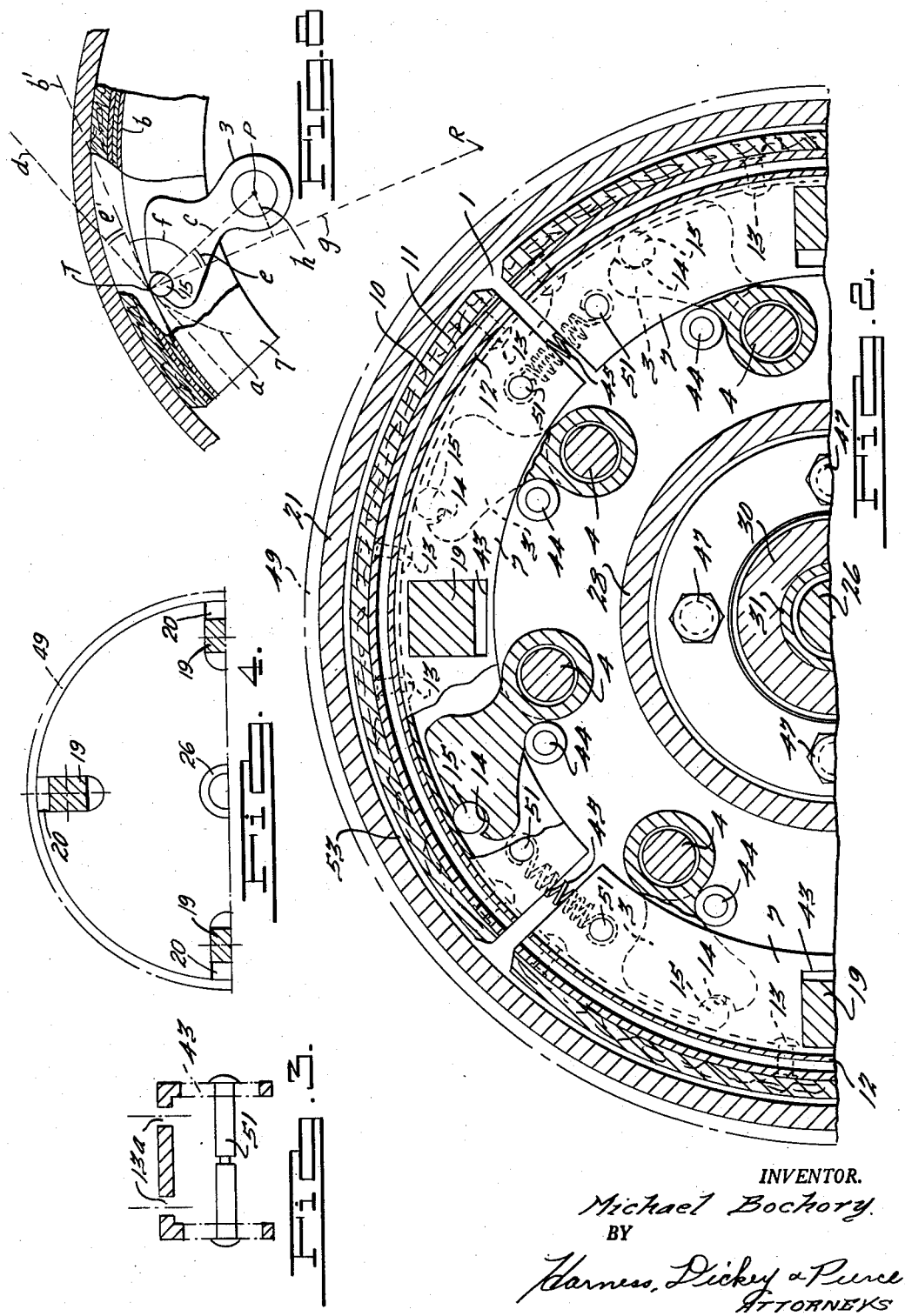

Aug. 11, 1959   M. BOCHORY   2,899,033
AUTOMATIC CLUTCH CONSTRUCTION
Filed Sept. 28, 1954   3 Sheets-Sheet 3
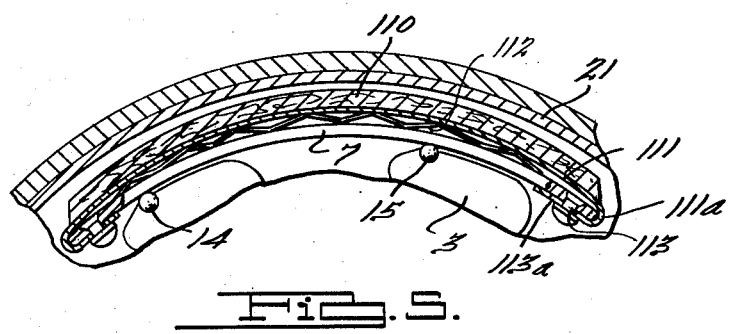
Fig. 5.
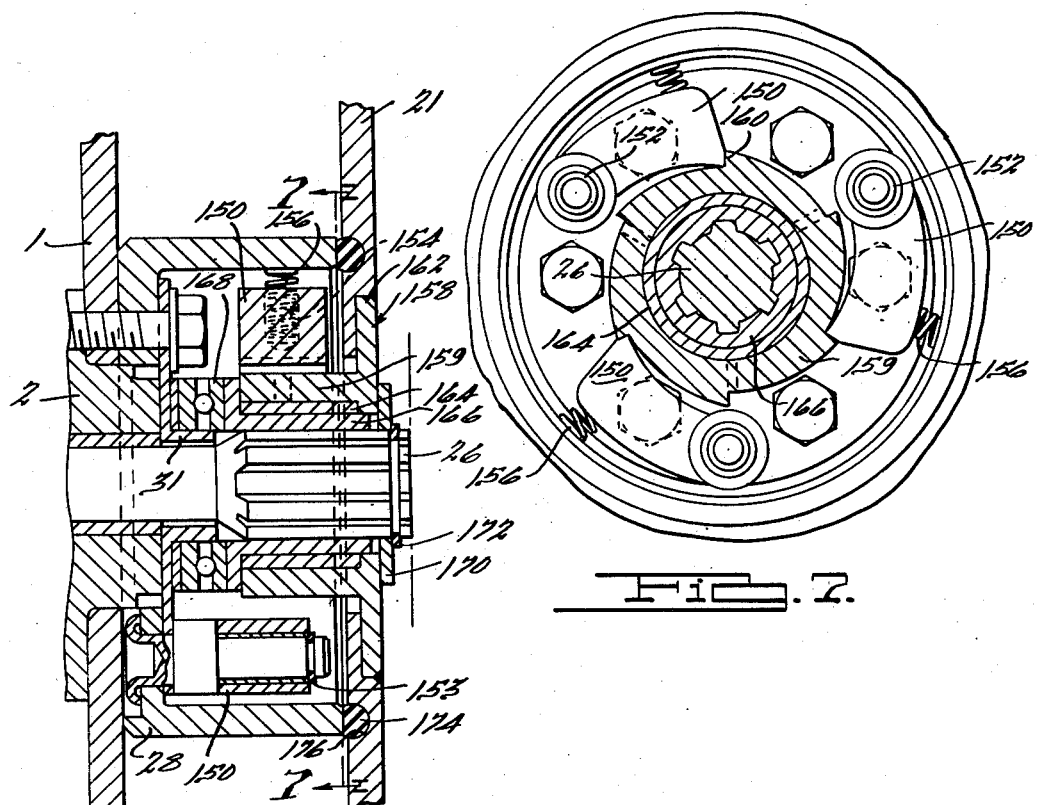
Fig. 7.
Fig. 6.
INVENTOR.
Michael Bochory.
BY
Harness, Dickey & Pierce.
ATTORNEYS.

United States Patent Office 2,899,033
Patented Aug. 11, 1959

2,899,033

AUTOMATIC CLUTCH CONSTRUCTION

Michael Bochory, Paris, France

Application September 28, 1954, Serial No. 458,926

Claims priority, application France January 26, 1954

10 Claims. (Cl. 192—48)

The present invention relates to automatic clutches, and has for its object an improved multiple clutch including an automatic clutch operated by centrifugal force; that is to say, a clutch wherein the clutching action is produced automatically at a certain operating speed of the engine.

The present invention has for its object a clutch of this category whose action is progressive and which is simple and sturdy, and which is particularly applicable to automobiles, but is capable of being given other applications.

Additional objects, taken singly or in combination, are as follows:

a. To provide, in combination, a main clutch operated by centrifugal force, an ordinary second clutch controlled by the direct action of the operator, particularly for changing speed gears in the case of an automobile, and a third clutch securing the drive of the drive shaft, in a single direction, by the driven shaft when the speed of this latter is the higher;

b. To provide a centrifugal-action main clutch operated by small masses subjected to centrifugal action, acting on shoes distributed circularly and combined with a drum connected to the driven shaft;

c. To provide an ordinary clutch in such a combination which may be controlled either electrically through the intermediary of an electromagnet, or mechanically, or through the intermediary of any servo-control, and which may in particular be of the disk type, the bringing together of the disks being controlled or effected, for example, through electromagnets disposed in a circuit whose switch is placed near the driver's hand, for example, on the change-speed lever. This clutch may also be controlled or actuated through the intermediary of any servo-control, during the changes of speed, or when it is desired to disengage the clutch when the speed is above the operating speed, when the small masses drive the drum of the centrifugal clutch or coupling;

d. To provide in such a device means securing the drive of the drive shaft by the driven shaft, when the speed of this latter is the higher, such means being preferably constituted by a spring disposed inside a drum integral with the drive shaft;

e. To provide shoes mounted by slides upon supports whose section is, for example, rectangular or square, which secures limitation of the travel of the said shoes, in both directions, avoiding lateral pivoting of them, and decreasing friction;

f. To provide small masses for the centrifugal clutch or coupling action mounted on the engine flywheel and which bear against the shoes by means of rolling elements such as balls, disposed in a suitable housing, the assembly of these rolling elements exceeding the lateral width of the small masses in such a way that these rolling elements are in contact with the inner walls of the shoes;

g. To provide shoes which are connected to one another by springs or analogous means tending to keep the shoes slightly separated from the clutch drum, and in such a way that the shoes exert no considerable centrifugal thrust becoming added to that due to the small masses;

h. To provide shoes which exert their pressure on the clutch drum by means of circular shoe-soles or plates. These plates may in particular comprise a metal part upon which is mounted a covering or lining of a material which resists friction and heat, springs, in the form of leaf springs, for example, being interposed between the said shoes and the said shoe-soles or plates;

i. To provide a clutch associated with the centrifugal clutch and constituted by a friction plate held back by a spring and capable of being attracted by an electromagnet, the travel of the friction plate being limited by a stop connected to the driven shaft, in such a way as to prevent the said plate from sticking to the electromagnet;

j. To provide a stop, against which bears an element integral with the centrifugal clutch drum (particularly the ball race or an analogous part upon which it is mounted), limiting the displacement of this drum in the direction of the drive shaft;

k. To provide a seal ring, which simultaneously provides lubrication, in the central part of the centrifugal clutch drum.

Other characteristics of the invention will appear during the course of the description of embodiments of the invention, shown by way of example in the annexed drawings, in which:

Figure 1 is a view, in a longitudinal axial section, of a multiple clutch constructed in accordance with the invention;

Fig. 2 is a cross section view along line 2—2 of Fig. 1;

Fig. 3 is a sectioned view of a shoe;

Fig. 4 is a schematic view, on a reduced scale, of the engine flywheel;

Fig. 5 shows a modified shoe structure;

Fig. 6 shows a section of automatic re-starting clutch of modified form;

Fig. 7 is a sectional elevational view on the line 7—7 of Fig. 6; and

Fig. 8 is a cross section view similar to Fig. 2, showing some of the elements shown in Fig. 2 in engaged position and illustrating the geometrical relationship of these elements.

In the embodiment of Figs. 1–4, a clutch case or housing 39 is mounted integrally with a speed-gear case or housing 50.

Inside the case 39 is disposed an engine flywheel 1, driven by a drive shaft 2. The fly-wheel 1 is formed with rectangular cut-outs 20 as best shown in Fig. 4. Support parts comprising a screw threaded portion 8 and an elongated extension 19 having a rectangular cross section extend respectively through the rectangular cut-outs 20 of the fly-wheel, with a portion of the elongated extensions 19 respectively located in the rectangular cut-outs so that the support parts are prevented from turning in the cut-outs. Mounted on the portion of the extensions which project beyond the right face of the fly-wheel, as viewed in Fig. 1, are respectively shoes 7 of U-shaped cross section, the flanges of which are provided with rectangular holes 43, which, as can be best seen in Fig. 2 extend in radial direction of the clutch to a distance greater than the extension 19, so that the shoes 7 may slide in radial direction while being guided on the side faces of the extension 19. The extensions 19 form therefore a guide means for guiding the shoes 7 for movement in radial direction. Nuts 52 screwed on the ends of the threaded portions 8 of the support parts and shoulders 19' formed on the opposite end of the support parts and engaging the right flanges, as viewed in Fig. 1, of the U-shaped shoes 7 prevent the support parts from moving in axial direction thereof and hold the U-shaped shoes 7 on the extensions 19 of the support parts.

At the upper part of the shoes 7 is provided a plate 11, mounted upon it by means of pins 13 situated in holes 13A. Between this shoe-sole or plate 11 and the shoe 7 is disposed a leaf spring 12, which keeps these two elements separated from one another by a certain distance. To the plate 11 is fastened a brake lining 10, cemented on or attached by rivets.

Inside the shoe 7 are mounted small masses 3 which are able to turn on their bearings 16 about pivot pins 4. They are retained by washers 17 and pins 18. These small masses have at their top a recess 14, inside which balls 15 are mounted freely. When centrifugal force moves the small masses, these masses thrust on the shoes through the intermediary of the balls which rub against their inner walls.

The pivot pins 4 mounted on the engine flywheel 1 have a shoulder 5 on the side of the flywheel, and are held on the other side by nuts 6.

Rearwardly projecting drum 28 is integral with the engine flywheel, and a larger forwardly projecting drum 21 is mounted by means of roller bearings 25 and 25a upon the driven shaft 26, and spacedly overlaps drum 28. Drum 21 comprises a central ring 21A, through the intermediary of which it is mounted on the roller bearings 25, 25a. Between this ring 21A and the drum 28 integral with the flywheel 1 is interposed an auxiliary overrunning clutch spring 29.

The drum 21 turns freely on the driven shaft 26. It is provided with a hole 23, inside which fits one of the ends 24 of spring 29. The other end of spring 29 is free, and is situated in the space comprised between the drum 28 and the central ring 21A.

When the speed of the transmission shaft is higher than the rotary speed of the drive shaft, this causes the ring 21A to carry along with it the spring 29, whose diameter increases, so that it comes to rub against the inner walls of the drum 28, which progressively increases the adherence, and through the intermediary of the drum 28 the drive shaft 2 becomes driven.

When the vehicle is on a slope, for example, with its engine stopped, if the desired speed gear is engaged, the vehicle becomes braked by its engine because of the fact of the drive thus produced through the action of the spring 29.

On the other hand, if one goes back one speed, or else in normal running with the accelerator released, the vehicle does not free-wheel, because of the fact that a drive exists so long as the speed of the driven shaft is higher than the speed of the drive shaft.

A stop 30, housed in a support 31 integral with the drive shaft 2, is held by bolts 47. This stop has the purpose of keeping constant the gap between the drum 21 and the engine flywheel 1.

A ring 27 holds in position the roller bearings 25 and 25a, as well as the drum 21, the assembly being mounted upon the transmission shaft 26. It is, of course, understood that the bearings 25 and 25a may be mounted directly on the driven shaft, and that the drum 21 may similarly be mounted directly on the driven shaft without the intermediary of roller bearings.

A seal ring 32 is provided in a housing in the central part of the drum 21, under conditions which permit lubrication but which prevent the lubricant from coming into contact with the brake lining 35.

Upon the driven shaft 26, at the rear, is mounted a friction plate 34 which is able to slide in grooves 33 in this shaft. Between the friction plate 34 and the drum 21 is situated a clutch lining 35. This plate 34 is pressed against the drum 21 by means of a spring 36, which is mounted at one end on a shoulder stop 37 and at the other end of the friction plate 34.

An electromagnet 40, with its winding 41, is mounted upon a support 42 inside the case 39. The positive lead and the ground lead of the electromagnet 40 are connected on the one hand to the battery or to any other source of electricity, and on the other hand, through the intermediary of a contact which is not illustrated and which controls it at the desired moment, to the speed-changing mechanism, for example.

The friction plate 34, the spring 36, and the ring-stop 37 (which is held in position by a snap ring 38 or by any other means) are integral with the transmission shaft 26.

When the electromagnet is supplied with current it attracts the friction plate 34, whose travel is limited by the shoulder stop 37. The friction plate 34 should never cling to the electromagnet when that magnet becomes magnetized.

When the electromagnet attracts the friction plate 34, that plate compresses the spring 36, moves away from the drum 21, and the transmission shaft 26 then turns freely, without being driven by the drive shaft 2.

Furthermore, and as is illustrated in Fig. 2, the stops 44 prevent the small masses 3 from making a noise, or prevent them from moving undesirably when inoperative. When the engine is stopped, the small masses 3 rest at one side against the stops 44 and at the other side against the walls of the shoes 7 through the intermediary of the balls 15 which are disposed inside the housing 14. When the engine reaches a given rotational speed, centrifugal force actuates the small masses, which thrust the shoes 7 outwardly, the brake lining 10 frictionally engages, and gently and progressively drives the drum 21. At this moment the leaf spring 12 is compressed, also progressively, in such a way as to avoid any chattering.

The rivets 33, by means of which the plates 10, 11 are mounted on the shoes 7, slide in the holes 13a of these shoes, when the spring 12 is compressed.

Pins 51' are fastened to and extend between the flanges of the U-shaped shoes 7 (Fig. 3). To these pins are hooked springs 45 (Fig. 2) which hold the shoes while preventing them from moving away from one another so long as the engine speed does not reach a given rotational speed; and when that figure is reached, the small masses commence to move away from the center and to exert their thrust. The pins 51, moreover, improve the resistance to deformation of the lateral webs of the shoes 7.

When the engine is stopped, or when it is running at a low speed, a gap 53 exists between the brake lining 10 and the drum 21, this being for the purpose of preventing any friction, and consequently for preventing any heating or wear of the linings.

The openings 43 formed in the lateral walls of the shoes, into which enters the square-shaped support 19, are rectangular, and the clearance between the bottom of these openings and this square support in such that it allows the shoes to travel a certain distance while preventing the said shoes from going beyond a limit position when the linings, as a result of long wear, have been worn away to a certain degree. For this purpose the bottoms of the openings 43 form stops when the engine speed reaches a maximum and when the small masses 3 develop a force that produces a risk of breaking the drum 21 through the pressure exerted by the shoes 7.

The specific way how the small masses, or weight member means 3 are mounted and cooperate with the other elements of the clutch can be best explained with reference to Fig. 8. From the description above it is understood that the clutch shoe 7 is capable of moving radially, i.e., toward and away from the axis R about which the shaft rotates. The weight member means 3, on the other hand, is pivoted about a pivot axis extending parallel to the axis R. The weight member means 3 carries a contact ball 15 and the trajectory of the point T at which the weight member means 3 through the intermediary of the ball 15 contacts the contacting surface $b$, that is the innermost surface of the spring 12, as shown in Fig. 2, is indicated by the dotted line a.

According to the present invention the arrangement of the parts is such that when the weight member means 3 has moved the shoe 7 into engagement with the drum 21, the angle $e'$, that is the angle between the trajectory $a$ and the contact surface $b$, or the angle between the plane $d$ tangent to the trajectory $a$ at the contact point T and the plane $b'$ tangent to the contact surface $b$ at the contact point T is considerably smaller than the angle $f$ between the plane $b'$ and the plane $c$ passing through the contact point T and the axis P of the weight member 3.

Fig. 8 shows also an angle $e$ which is equal to the angle $e'$, since line $g$ is normal to the line $b'$ and line $c$ is normal to the line $d$. The above described geometrical relationship may therefore also be expressed as follows:

A plane containing the pivot axis P and passing through the point of contact T between the weight member means and the engaging surface $b$ forms an angle with the plane containing the axis of rotation R of the shaft and passing through the point of contact T is considerably smaller than the angle $f$ formed between the plane containing the pivot axis P and passing through the point of contact T and the plane tangent to the contact face $b$ and passing through the contact point T.

When the arrangement of the parts is such that the angle $e$ is relatively small compared to the angle $f$, then the shoe 7 will for all practical purposes, be incapable of causing the weight member 3 to rotate in a direction opposite to that in which it is intended to be rotated by centrifugal force. This is so inasmuch as the force which the shoe 7 can exert upon the weight member 3 must act in the direction of the plane $g$, so that the lever arm, indicated with $h$ in Fig. 8, of this force relative to the pivot axis P is relatively small. It is evident from Fig. 8 that the smaller the angle $e$ is, the smaller will be the lever arm $h$ and the less will the shoe 7 be capable of rotating the weight 3 in counter clockwise direction (as viewed in Fig. 8) about the pivot P. In this way, a self locking effect is obtained and this will assure a firm frictional contact between the shoe 7 and the drum 21. A weight member means 3 of relatively small mass can therefore, with the specific arrangement of the elements as shown in Fig. 8, insure a secure locking action in the centrifugal clutch of the present invention.

The functioning of the apparatus is as follows:

When the engine is stopped, and when it is running at slow speed, no drive is produced. The shoes 7 mounted on the engine flywheel 1 are held by the springs 45 in a disengaged position. The driven shaft 26, upon which the drum 21 rests, commences to be driven only after the moment when the engine is accelerated to a certain speed.

By engaging the first speed and accelerating the engine progressively, the small masses 3, actuated by centrifugal force, spread apart the shoes 7, which has the result of compressing the leaf spring 12, as well as the brake lining 10 of a suitable material, against the walls of the drum 21, which commences to be progressively driven. Because of the fact that the friction plate 34 is pressed by the spring 36 against the drum 21, this latter is integral with the transmission shaft 26. Because of this fact, by progressively increasing the engine speed, the driven shaft becomes progressively driven.

If the engine speed is reduced to such extent that the flyweights 3 would not keep the friction clutch from slipping, and the driven shaft 26 is tending to turn at a higher speed than the engine, the driven shaft drives the engine through the intermediary of the spring 29.

If it is for example desired to start the engine by pushing the car, one commences by disengaging the ordinary clutch by pressing on the contact of the electromagnet 41. At this moment it is possible to engage the desired speed. By releasing the contact, the circuit becomes broken, making integral the friction plate 34, the drum 21, and the transmission shaft 26. If the car is pushed, the spring 29 drives the drive shaft 2 through the intermediary of the drum 28 which is integral with the said drive shaft, which causes the engine to start. The case is similar when it is desired to leave the car on a slope, with a gear engaged, in order to utilize the braking action of the engine.

It is of course understood that at each change of speed gear, when the change-speed lever is operated, this establishes a contact which controls the disengagement of the electric clutch, as well as establishing the engagement of this clutch directly the speed is engaged.

It is of course also understood that the drive through the intermediary of the spring 29 may also be effected by means of pawls or free-wheel bearings, as illustrated in Figs. 6 and 7, without this changing the purpose envisaged.

It is also possible, instead of using an electromagnet, to control the disengagement by any other servo-control means, or else to control everything manually by using an ordinary clutch.

Another embodiment of the invention is illustrated in Fig. 5 and includes the drum 21, shoes 7 and the small masses 3 which carry the freely mounted balls 15 in the recesses 14, the small masses thrusting on the inner surfaces of the shoes 7 through the intermediary of the balls 15 when centrifugal forces move the small masses outwardly. In this embodiment of the invention, a plate 111 is mounted in each of the shoes 7, the opposite end portions of each plate 111 being return bent around the opposite ends of the associated shoe 7, as at 111a. The curvature of the plates 111 is initially greater than the curvature of the inner surface of the drum 21 while the curvature of the radially outer surface of the shoes 7 is substantially the same as the curvature of the inner surface of the drum 21. The plates 111 are secured to the shoes 7 by rivets 113, the shank portions of which pass through elongate slots 113a defined by the end portions of the plates 111. Such a construction permits the plates 111 to move radially outwardly toward the drum 21 when pressure is applied to the plates. A wavular leaf spring 112 is interposed between each plate 111 and the associated shoe 7, the wavular springs 112 normally holding the shoes 7 and the plates 111 separated by a predetermined distance. A brake lining 110 is fixed to the radially outer surface of each plate 111 by any suitable means, as for example, with rivets or a suitable cement, so that the curvature of the brake lining 110 conforms to the curvature of the plate 111.

In the operation of this embodiment of the invention, when the engine speed reaches a predetermined figure, the centrifugal forces actuate the small masses 3 which pivot outwardly and force the shoes 7, the plate 111 and the brake lining 110 outwardly toward the drum 21. Since the curvature of the brake lining is greater than the curvature of the inner surface of the drum 21, the longitudinal central portion only of the brake lining initially bears against the drum 21 to drive the drum. As the centrifugal forces increase, the wavular spring 112 is compressed, and the slots 113a permit the plate 111 to move with respect to the associated shoe 7 so that the curvature of each plate 111 and brake lining 110 gradually approaches the curvature of the inner surface of the drum 21 with the result that progressively larger areas of the brake lining bear against the drum to drive the drum. When the shoes 7 reach the limit position, substantially all of the brake lining surface will bear against the inner surface of the drum to drive the drum.

When the engine is stopped, or when the engine is operating at a relatively low speed, a gap exists between the brake lining 110 and the drum 21 thereby eliminating friction forces and preventing heating or wearing of the lining.

In the embodiment of the invention shown in Figs. 6 and 7, pawls 150 are provided which are pivotally mounted on pivot pins 152 carried by the drum 28, the pawls being retained by suitable snap rings 153, and the drum 28 being integral with the engine flywheel 1 in the manner previously described. The pawls 150 are relatively light in weight and each of the pawls 150 defines a recess 154 adapted to receive one end portion of a relatively light coil spring 156, the opposite end portions of each of the coil springs 156 bearing against the inner surface of the drum 28. A ratchet wheel 158 is provided having a hub portion 159 provided with teeth 160 adapted to engage the pawls 150 when the engine is stopped. The ratchet wheel 158 also includes a radially extending flange portion 162 that is fixed to the drum 21, as by welding, the drum 21 being drivably connected to the driven shaft 6 through the agency of the brake lining 35 and the friction plate 34 in the manner previously described. The hub portion 159 of the ratchet wheel 158 is mounted on a sleeve bearing 164 and the sleeve bearing 164, in turn, is mounted on a ring 166 keyed to the driven shaft 6. With such a construction the drum 21 and the ratchet wheel 158 rotate freely about the axis of the driven shaft 6. A suitable thrust bearing 168 is provided, the thrust bearing being retained by the ring 166 and the retainer 31. A retaining ring 170 is also provided which serves to maintain the drum 21 and ratchet wheel 158 in the proper position on the driven shaft 6, the retaining ring 170 being secured by a snap ring 172. A suitable sealing member 174 is mounted in a groove 176 in the drum 21, the sealing member 174 bearing against the adjacent end of the drum 28 to seal the assembly.

In the operation of this embodiment of the invention, when the engine flywheel 1 is rotating, the pawls 150 pivot outwardly against the relatively light springs 156, and the pawls 150 are preferably disengaged from the teeth 160 of the ratchet wheel 158 whenever the engine is operating. However, when the engine is stopped, the relatively light springs 156 pivot the pawls 150 inwardly so that the pawls engage the teeth 160 of the ratchet wheel 158 with the result that the driven shaft 6 may be drivably connected to the drive shaft 2 through the drum 28, pawls 150, ratchet wheel 158, drum 21, and the clutch lining 35 and friction plate 34 while the engine is stopped, thereby permitting the vehicle to be braked by the stopped engine so long as the clutch controlled by the action of the operator is engaged.

It should be noted that the invention can function with speed-changing boxes of any kind, mechanical, semi-automatic and automatic. It is moreover applicable to any clutch for engines, machine tools, and so forth, but is particularly applicable to clutches for automobile vehicles, trucks, tractors, motorcycles, scooters, helicopters, etc.

I claim:

1. A centrifugal clutch arrangement for coupling two shafts to each other comprising, in combination, first frictional clutch means adapted to be connected to one of said shafts for rotation therewith and having an inner cylindrical engaging surface coaxial with said one shaft; and second frictional clutch means rotatable with the other of said shafts, said second clutch means including frictional engaging means mounted for sliding movement in substantial radial direction into and out of frictional engagement with said engaging surface of said first clutch means, guide means for guiding said engaging means in said radial direction, and centrifugal actuator means mounted independently of said engaging means, said centrifugal actuator means being so arranged that when said other shaft rotates at at least a predetermined speed, said centrifugal actuator means are centrifuged outwardly into engagement with said engaging means and move the latter radially into frictional engagement with said engaging surface of said first clutch means, whereby said shafts are coupled to each other by said clutch arrangement when said other shaft rotates at at least said predetermined speed.

2. A centrifugal clutch arrangement for coupling two shafts to each other comprising, in combination, first frictional clutch means including a drum adapted to be connected to one of said shafts for rotation therewith and having an inner cylindrical engaging surface coaxial with said one shaft; and second frictional clutch means including a carrier rotatable with the other of said shafts, frictional engaging means mounted on said carrier for sliding movement in substantial radial direction into and out of frictional engagement with said engaging surface of said drum, guide means for guiding said engaging means in said radial direction, and centrifugal actuator means mounted on said carrier independently of said engaging means, said centrifugal actuator means being so arranged that when said other shaft rotates at at least a predetermined speed, said centrifugal actuator means are centrifuged outwardly into engagement with said engaging means and move the latter radially into frictional engagement with said engaging surface of said drum, whereby said shafts are coupled to each other by said clutch arrangement when said other shaft rotates at at least said predetermined speed.

3. A centrifugal clutch arrangement for coupling two shafts to each other comprising, in combination, first frictional clutch means including a drum adapted to be connected to one of said shafts for rotation therewith and having an inner cylindrical engaging surface coaxial with said one shaft; and second frictional clutch means including a carrier rotatable with the other of said shafts, frictional engaging means mounted on said carrier for sliding movement in substantial radial direction into and out of frictional engagement with said engaging surface of said drum, guide means for guiding said engaging means in said radial direction, and centrifugal actuator means mounted on said carrier independently of said engaging means, said centrifugal actuator means including at least one weight member mounted on said carrier for pivotal movement relative thereto about a pivot axis parallel to the axis of rotation of said other shaft and spaced from the center of gravity of said weight member, said weight member being so arranged that when said other shaft rotates at at least a predetermined speed, said weight member is centrifuged outwardly into engagement with said engaging means and moves the latter radially into frictional engagement with said engaging surface of said drum, whereby said shafts are coupled to each other by said clutch arrangement when said other shaft rotates at at least said predetermined speed.

4. A centrifugal clutch arrangement for coupling two shafts to each other comprising, in combination, first clutch means including a drum adapted to be connected to one of said shafts for rotation therewith and having an inner cylindrical engaging surface coaxial with said one shaft; and second clutch means including a carrier rotatable with the other of said shafts, engaging means mounted on said carrier for substantially radial movement into and out of engagement with said engaging surface of said drum, and centrifugal actuator means mounted on said carrier independently of said engaging means, said centrifugal actuator means including at least one weight member means mounted on said carrier for pivotal movement relative thereto about a pivot axis parallel to the axis of rotation of said other shaft and spaced from the center of gravity of said weight member means, said weight member means being so arranged that when said other shaft rotates at at least a predetermined speed, said weight member means is centrifuged outwardly into contact with said engaging means at a contact face thereof and moves said engaging means radially into engagement with said engaging surface of said drum and that when said engaging means have been moved into engagement with said engaging surface of said drum, a plane containing said pivot axis and passing through the point of contact between said weight member means and said engaging means forms an angle with a plane containing said axis of rotation of said other shaft and passing through said point of contact between said weight member means and said engaging means which is considerably smaller than an angle formed between a plane containing said pivot axis and passing through said point of contact and a plane tangent to said contact face and passing through said contact point, whereby a light weight member can be used for obtaining a great contact pressure between said engaging means and said engaging surface of said drum and so that said shafts are coupled to each other by said clutch arrangement when said other shaft rotates at at least said predetermined speed.

5. A centrifugal clutch arrangement as defined in claim 4 wherein said engaging means are slidably mounted for substantially radial movement.

6. A centrifugal clutch arrangement for coupling two shafts to each other comprising, in combination, first clutch means including a drum adapted to be connected to one of said shafts for rotation therewith and having an inner cylindrical engaging surface coaxial with said one shaft; and second clutch means including a carrier rotatable with the other of said shafts, engaging means mounted on said carrier for substantially radial sliding movement into and out of engagement with said engaging surface of said drum, spring means operatively associated with said engaging means for restraining outward movement thereof under the influence of centrifugal force, stop means for limiting the extent of radial movement of said engaging means, and centrifugal actuator means mounted on said carrier independently of said engaging means, said centrifugal actuator means including at least one weight member means mounted on said carrier for pivotal movement relative thereto about a pivot axis parallel to the axis of rotation of said other shaft and spaced from the center of gravity of said weight member means, said weight member means being so arranged that when said other shaft rotates at at least a predetermined speed, said weight member means is centrifuged outwardly into contact with said engaging means at a contact face thereof and moves said engaging means radially into engagement with said engaging surface of said drum and that when said engaging means have been moved into engagement with said engaging surface of said drum, a plane containing said pivot axis and passing through the point of contact between said weight member means and said engaging means forms an angle with a plane containing said axis of rotation of said other shaft and passing through said point of contact between said weight member means and said engaging means which is considerably smaller than an angle formed between a plane containing said pivot axis and passing through said point of contact and a plane tangent to said contact face and passing through said contact point, whereby a light weight member can be used for obtaining a great contact pressure between said engaging means and said engaging surface of said drum and so that said shafts are coupled to each other by said clutch arrangement when said other shaft rotates at at least said predetermined speed.

7. A centrifugal clutch arrangement as defined in claim 4 wherein said second clutch means further include resilient means carried by said engaging means and so mounted thereon as to be contacted by said weight member means so that said engaging means is moved by said weight member means through the intermediary of said resilient means.

8. A centrifugal clutch arrangement as defined in claim 4 wherein said engaging means include a plurality of arcuate clutch shoes and wherein said centrifugal actuator means include a plurality of pairs of weight member means operatively associated with said clutch shoes, respectively, the weight member means of each pair of weight member means being arranged, respectively, on opposite sides of a plane containing said axis of rotation of said other shaft and bisecting the respective clutch shoe.

9. A multiple clutch arrangement for use in motor vehicles, comprising, in combination, two coaxial shafts; a clutch member mounted for free rotation relative to said shafts; an electromagnetic clutch device between one of said shafts and said clutch member for coupling said one shaft and said clutch member to each other whenever desired; an over-running clutch device between the other of said shafts and said clutch member for coupling said other shaft and said clutch member to each other when said other shaft rotates faster than said clutch member; and a centrifugal clutch device between said other shaft and said clutch member for coupling said other shaft and said clutch member to each other when said other shaft rotates at at least a predetermined speed, said centrifugal clutch device comprising first frictional clutch means rotatable with said clutch member and having an inner cylindrical engaging surface coaxial with said shafts, and second frictional clutch means rotatable with said other shaft, said second clutch means including frictional engaging means mounted for sliding movement in substantial radial direction into and out of engagement with said engaging surface of said first frictional clutch means, guide means for guiding said engaging means in said radial direction, and centrifugal actuator means mounted independently of said engaging means, said centrifugal actuator means being so arranged that when said other shaft rotates at at least a predetermined speed, said centrifugal actuator means are centrifuged outwardly into engagement with said engaging means and move the latter radially into frictional engagement with said engaging surface of said first clutch means.

10. A multiple clutch arrangement for use in motor vehicles, comprising, in combination, two coaxial shafts; a clutch member mounted for free rotation relative to said shafts; an electromagnetic clutch device between one of said shafts and said clutch member for coupling said one shaft and said clutch member to each other whenever desired; an over-running clutch device between the other of said shafts and said clutch member for coupling said other shaft and said clutch member to each other when said other shaft rotates faster than said clutch member; and a centrifugal clutch device between said other shaft and said clutch member for coupling said other shaft and said clutch member to each other when said other shaft rotates at at least a predetermined speed, said centrifugal clutch device comprising drum means rotatable with said clutch member and having an inner cylindrical engaging surface coaxial with said shafts, a carrier rotatable with said other shaft, engaging means mounted on said carrier for substantially radial movement into and out of engagement with said engaging surface of said drum means, and centrifugal actuator means mounted on said carrier independently of said engaging means, said centrifugal actuator means including at least one weight member means mounted on said carrier for pivotal movement relative thereto about a pivot axis parallel to the axis of rotation of said shafts and spaced from the center of gravity of said weight member means, said weight member means being so arranged that when said other shaft rotates at at least said predetermined speed, said weight member means is centrifuged outwardly into contact with said engaging means at a contact face thereof and moves said engaging means radially into engagement with said engaging surface of said drum means and that when said engaging means have been moved into engagement with said engaging surface of said drum means, a plane containing said pivot axis and passing through the point of contact between said weight member means and said engaging means forms an angle with a plane containing axis of rotation of said shafts and passing through said point of contact between said weight member means and said engaging means which is considerably smaller than an angle formed between a plane containing said pivot axis and passing through said point of contact and a plane tangent to said contact face and passing through said contact point, whereby a light weight member can be used for obtaining a great contact pressure between said engaging means and said engaging surface of said drum.

References Cited in the file of this patent

UNITED STATES PATENTS

| | | |
|---|---|---|
| 1,285,809 | Seyfert | Nov. 26, 1918 |
| 1,730,890 | Kaisser | Oct. 8, 1929 |
| 1,730,937 | Kaisser | Oct. 8, 1929 |
| 1,917,501 | Cotterman | July 11, 1933 |
| 1,962,219 | Starkey | June 12, 1934 |
| 2,048,435 | Dodge | July 21, 1936 |
| 2,085,271 | Pfluger | June 29, 1937 |
| 2,104,014 | Banker | Jan. 4, 1938 |